United States Patent [19]

Koyama et al.

[11] 4,336,227
[45] Jun. 22, 1982

[54] FLUIDIZED BED REACTOR

[75] Inventors: Shuntaro Koyama, Hitachi; Tomohiko Miyamoto, Takahagi; Mizuho Hirato, Hitachi, all of Japan

[73] Assignee: The Agency of Industrial Science and Technology, Tokyo, Japan

[21] Appl. No.: 125,086

[22] Filed: Feb. 27, 1980

[30] Foreign Application Priority Data

Feb. 27, 1979 [JP] Japan .................................. 54-21332

[51] Int. Cl.³ ...................... G05D 7/00; G05D 16/00; B01J 8/18; F27B 15/08
[52] U.S. Cl. .................................... 422/111; 422/112; 422/139; 422/145; 73/196; 110/245; 110/263; 34/10; 34/57 A; 432/15; 432/58
[58] Field of Search .............. 422/111, 112, 145, 139; 73/196, 861.42; 208/DIG. 1; 122/4 D; 110/245, 263; 34/10, 57 A; 432/58, 15; 266/172

[56] References Cited

U.S. PATENT DOCUMENTS 2,862,162 11/1958 Baring ............................. 73/861.42
3,192,644 7/1965 Knibbs et al. ....................... 422/139

Primary Examiner—Frank W. Lutter
Assistant Examiner—Chris Konkol
Attorney, Agent, or Firm—Birch, Stewart, Kolasch & Birch

[57] ABSTRACT

In a fluidized bed reactor having a reactor vessel, two detector vessels are mounted in the reactor vessel near the inside surface of the reactor vessel in the fluidized bed and in the gas outlet region. Each detector vessel contains larger detecting particles and passes the gas in the reactor vessel. Pressure drop across the detecting particles is measured. The ratio of the two pressure drops represents the ratio of the fluid velocity and minimum fluidizing velocity under the operating conditions and can be used as control factor.

4 Claims, 5 Drawing Figures

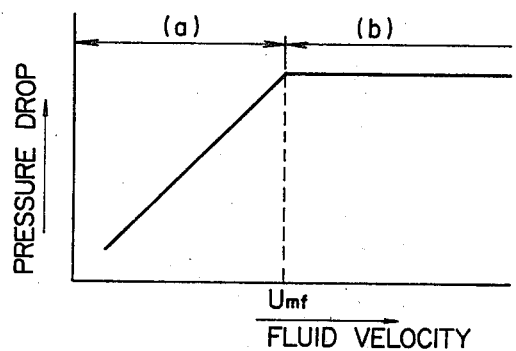
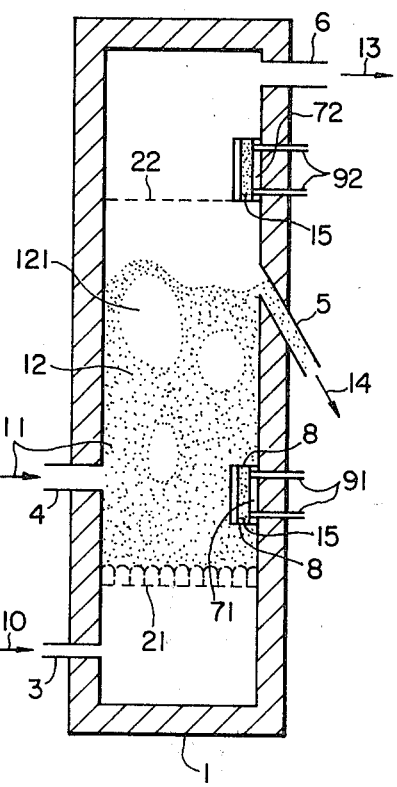
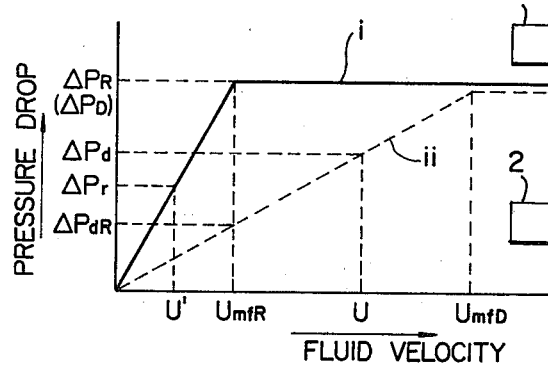

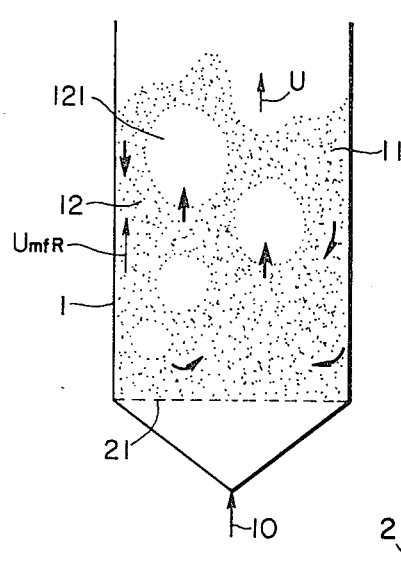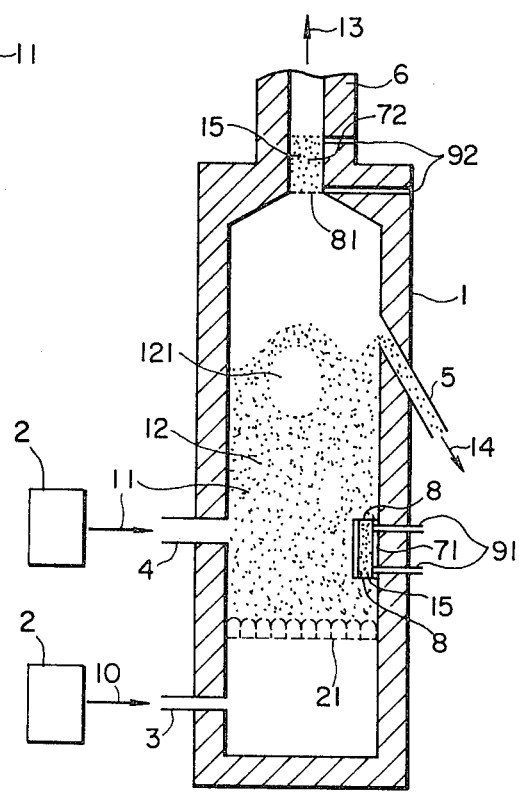

FLUIDIZED BED REACTOR

BACKGROUND OF THE INVENTION

1. Field of the Invention

The present invention relates to a fluidized bed reactor, and more specifically to a fluidized bed reactor which is suitable to treat particles or gas which change properties by the reaction, and which includes a reactor vessel which is vertically divided into three regions by spaced distributor plates, a gas inlet conduit through the lower region, a particles inlet which introduces particles to be treated into the middle region, a product gas outlet communicated with the upper region, and an overflow which discharges reacted particles from the middle region.

2. Description of the Prior Art

Recently, after successful results obtained by fluid catalytic cracking methods in the petroleum industry, fluidized bed reactors are being broadly utilized in the chemical and metallurgical industries as catalytic reaction, calcination, drying and particle transportation apparatus. The fluidized bed reactor is a reaction device which forms a fluidized bed formed by the reaction particles by blowing fluidizing gas into a fixed bed of the reaction particles.

Generally, transformation from a fixed bed to a fluidized bed is illustrated in FIG. 1. The fluid velocity is illustrated by the logarithmic scale in FIG. 1. In FIG. 1, range (a) is a fixed bed and the second range (b) is a fluidized bed. In the fixed bed, pressure drop in the bed increases as fluid velocity is increased, i.e. as fluid flow rate increases. That is, particles float in fluid flow by fluid resistance applied to the particles against gravitational force. At a fluid velocity, the pressure drop is constant. The floating condition of the particles is called fluidized bed. In this specification, the critical fluid velocity corresponding to the transition from the fixed bed to the fluidized bed is called minimum fluidizing velocity Umf, which varies depending upon the properties of the particles, e.g. diameter, specific gravity and sphericity of particles.

Fluidized bed reactors utilize the above mentioned characteristics of a fluidized bed. It is desired to maintain good fluidization, i.e. movement of the particles is excellent and entrainment of the particles is less. To obtain such fluidization condition, it is necessary to control the fluid velocity U of gas which has passed through the fluidizing bed. As the properties of the fluid and reacting particles change by the reaction process, the minimum fluidizing velocity Umf is also changed. Thus, the velocity Umf must be detected to obtain proper control. Thus, it is desirable to monitor the fluid velocity U and the minimum fluidizing velocity Umf continuously all through the operation, and also it is desirable to obtain the function f (U, Umf) in a form which can be utilized to operate the fluidized bed.

Methods to detect the velocities U and Umf which have been proposed are as follows:

(1) Means to assume the velocity Umf, by the sampling method.

Property of particles under reaction, e.g. diameter, density and sphericity of particles, and property of fluid under reaction, e.g. viscosity and density, are detected by sampling and analysis, and the velocity Umf is assumed. The sampling and analysis necessitate relatively long time so that it is difficult to obtain continuous data to be used as operation control. When the properties are not detected, accurate assumed value of the velocity Umf cannot be obtained. Experimental formulae and theoretical formulae to assume the velocity Umf are not accurate enough, especially at a high temperature range.

(2) Means to assume the fluid velocity U by the fluid velocity measuring method.

The fluid velocity is measured directly or indirectly outside the reactor. Indirect measurement includes the disadvantage that the vaporizable liquids content must be added afterwards. Reliability of the measurements is very low, as, many factor, e.g. pressure, temperature, particle entrainment, influence the fluid velocity under operation.

(3) Method to assume fluid velocity U by the gas quantity measuring method.

When gas is obtained as a product of the reactor, the produced gas is guided outside the reactor and the gas quantity is measured. From the gas quantity, minimum fluidizing velocity Umf is assumed. Normally, steam and vapor are condensed before the measurement. Thus, it is not easy to assume true fluid flow condition from such measurement of dry gas.

As stated above, conventional measurement methods measure the fluid velocity U and the minimum fluidizing velocity Umf independently, and no reliable result can be obtained. Relation between the method of operating the reactor and the velocities U and Umf is as follows: The operating condition of the fluidized bed reactor is determined based on the velocities U and Umf, and the reactor is actually operated by the determined operating condition. Actual velocities U and Umf are measured under operation, and the operating condition is modified. Such operating method is suitable for an established process. However, when it is desirable to introduce a new operating condition, some means is necessary to judge whether factors to be controlled do or do not coincide with the predetermined or expected values.

Methods of the judgement which have been proposed are as follows:

(4) Method of measuring the pressure drop across a fluidized bed.

The pressure drop across a fluidized bed is one of the most suitable measurable factors to judge the operating condition of a fluidized bed reactor as the pressure drop relates directly to the motion of particles. However, the pressure drop cannot be quantitatively related to all operating conditions of fluidized bed reactors. Thus, under normal operating conditions of a specified reactor for an established process, the pressure drop can be successfully utilized to assist experimental judgement. In transient operating conditions, e.g. starting up, or in new operation, monitoring the pressure drop cannot maintain a suitable fluidized bed condition.

(5) Method of measuring temperature distribution in fluidized bed.

Temperatures are measured at many points in the reactor vertically and horizontally, to know operating condition of the fluidized bed. Generally, when particle movement is strong, reactor temperature is substantially uniform. When any stagnant zone is produced, local temperature change indicates where the stagnant zone is. Uniformity of the temperature directly relates to the fluid velocity U, and temperature difference across the fluidized bed decreases as the fluid velocity is increased. However, it is not necessary to increase the fluid velocity more than needed to maintain the fluidized bed. The temperature distribution cannot quantitatively be related to all operating conditions of the fluidized bed, so that is is also used to assist in the experimental decision under normal operating conditions. As described in detail, conventional operation of fluidized bed reactors has been performed experimentally with assistance of pressure drop across fluidized bed and temperature distribution, and also inaccurate assumed values of fluid velocity U and minimum fluidizing velocity Umf. As the velocities U and Umf cannot accurately be obtained, safe side operation or erroneous operation may be the result. This means disturbance to the development of fluidized bed operating technics.

SUMMARY OF THE INVENTION

The object of the present invention is to provide a fluidized bed reactor which accurately detects fluid velocity U and minimum fluidizing velocity Umf which are essential to maintaining suitable fluidized bed conditions.

The present invention does not detect the velocities U and Umf independently, but detects the velocities as a function f (U, Umf). To this end, to utilize characteristics of a fluidized bed, or to utilize the fact that the velocity Umf differs by characteristics of particles, at a region of the reactor in which gas flow velocity represents the velocity Umf and at a region of the reactor in which reacted gas flow has passed through the fluidized bed, two pressure drop detectors are inserted. Each pressure drop detector contains particles which has larger velocity Umf than that of the reacting particles and the reacting gas also passes through the detectors. Pressure drops are detected across the detectors and the ratio between the pressure drops represents the function of f (U, Umf), as described hereinafter.

The inventors of the present invention recognized that by utilizing the fact that the velocity Umf differs according to characteristics of particles, the function f (U, Umf) can be detected, and the function f (U, Umf) can be detected as U/Umf by suitably selecting particles. This is explained referring to FIG. 2. In FIG. 2 the fluid velocity is not shown by logarithmic scale. The example shown in FIG. 2 shows that pressure drop increases proportionally to fluid velocity in the fixed bed region. If FIG. 2, particles D is represented by curve (ii) and particles R which are smaller diameter than that of the particles D are represented by curve (i). The minimum fluidizing velocities of the particles D and R are shown as UmfD and UmfR respectively, and UmfD is larger than UmfR. Pressure drop when particles D and R are in fluidized bed condition is represented as $\Delta PD = \Delta PR$. Pressure drops when particles D and R have not reached to fluidized bed condition are represented as $\Delta Pd$ and $\Delta Pr$ respectively. Pressure drop of particles D at the velocity Umfr is shown as $\Delta PdR$.

Generally, relation between pressure drop $\Delta P$ and fluid velocity U is represented as follows:

$$\Delta P = \alpha U + \beta U^2 \quad (1)$$

in which, $\alpha$ and $\beta$ are constants based on characteristics of particles and gas. As to the particles D, the following relation can be described.

$$\frac{\Delta Pd}{\Delta PdR} = \frac{\alpha U + \beta U^2}{\alpha UmfR + \beta U^2 mfR} \quad (2)$$

The formula (2) shows that by detecting $\Delta Pd/\Delta PdR$ function f (U, Umf) can be detected.

By suitably selecting particles, the function f (U, Umf) can be represented as U/Umf or (U/Umf)$^2$ to simplify monitoring of the operation. More specifically, formula (2) is rewritten.

$$\frac{\Delta Pd}{\Delta PdR} = \frac{U}{UmfR} \left( \frac{1 + \beta U/\alpha}{1 + \beta UmfR/\alpha} \right) \quad (3)$$

That means, when both $\beta U/\alpha$ and $\beta UmfR/\alpha$ are far less than 1, $$\frac{\Delta Pd}{\Delta PdR} = \frac{U}{UmfR}$$

Generally, $\beta U/\alpha$ is represented as follows:

$$\frac{\beta}{\alpha} U = \frac{1.75 \phi \rho g dDU}{150 (1 - \epsilon) \mu} = 0.015 \, ReD \quad (4)$$

in which, $\phi$ is spherical factor of particles, $\rho g$ is density of gas, dD is diameter of particles, $\epsilon$ is void fraction, $\mu$ is viscosity of gas, ReD is Reynolds number. When ReD is less than 10, numerator of formula (3) is about 1. Also, when the Reynolds number ReD' which is Reynolds number for $\beta UmfR/\alpha$ is less than 10, denominator of formula (3) is about 1. Usually the reactor is operated such that the fluid velocity is more than UmfR, so that necessary calculation of the Reynolds number is only ReD.

From the formula (4), when Reynolds number is ReD' is more than 600, the next formula obtained is:

$$\frac{\Delta Pd}{\Delta PdR} = \left( \frac{U}{UmfR} \right)^2$$

As described above, when particle D is selected to satisfy that Reynolds number is less than 10 or more than 600, the ratio $\Delta Pd/\Delta PdR$ represents U/UmfR or (U/UmfR)$^2$.

As described above, the particles R are particles to be reacted, and particles D are particles in the detectors, and pressure drops across the detectors are measured at velocities U and UmfR. From the detected values, the function f (U, UmfR) and also U/UmfR can be easily determined.

The present invention will be described further referring to embodiments, by way of example, and the accompanying drawings, in which:

BRIEF DESCRIPTION OF THE DRAWINGS

FIG. 1 and FIG. 2 are illustrations of general tendencies between pressure drop and fluid velocity in fluidized bed reactors, FIG. 3 is a longitudinal sectional view of a fluidized bed reactor, according to one embodiment of the present invention, FIG. 4 is an illustration showing gas flow and particle movement in a fluidized bed, and FIG. 5 is a longitudinal sectional view of a fluidized bed reactor, according to a second embodiment of the present invention.

DESCRIPTION OF PREFERRED EMBODIMENTS

One embodiment of a fluidized bed reactor, according to the present invention is shown in FIG. 3, wherein 1 designates a generally cylindrical reactor vessel which is vertically divided into three regions by spaced gas distributors 21 and 22. The lower region forms a wind box, the middle region forms a reaction chamber of fluidized bed formed by particles to be treated, and the upper region forms a free board. To one side of the reaction vessel 1, a gas inlet 3 communicates with the lower region, a solid inlet 4 communicates with the lower portion of the middle region, and from the other side of the reaction vessel, an overflow pipe 5 communicates with upper portion of the middle region, and a gas outlet 6 communicates with the upper region.

Detector vessels 71 and 72, according to the present invention, are mounted to the inside wall of the reactor vessel 1 at the lower portion of the middle region and at the upper region, respectively. Each detector vessel 71 and 72 is a cylinder which is mounted near the inside wall of the reactor vessel 1 within a range of 1/7 of the inside diameter of the vessel 1. The detector vessel 71 has wire nets 8 at the upper and lower end and the detector vessel 72 contacts with the gas distributor 22 at lower end to contain particles in the detector vessel 71 and 72. The particles in the detector vessels 71 and 72 are detector particles which have larger minimum fluidizing velocity Umf than that of particles in the reactor vessel 1. Each detector vessel 71 and 72 has two pressure drop sensing conduits 91 and 92 which communicate with upper and lower portions of the detector vessel 71 and 72 and are communicated outside through the side wall of the reactor vessel 1.

Operation of the fluidized bed reactor shown in FIG. 3 is as follows:

Gas 10 which contributes to fluidizing is supplied through the gas inlet 3 into the lower region of the vessel 1. Gas flows through the gas distributor 21 into the middle region. Particles 11 to be treated are fed into the middle region through the solid inlet 4, and form a fluidized bed cooperating with the gas 10. In the fluidized bed, reaction of particles 11 by high temperature and/or reaction between the particles 11 and the gas 10 produces gas 13 which flows upwards from upper portion of the fluidized bed. The produced gas 13 is separated from entrained fine particles by passing through the gas distributor 22 and is introduced outwards through the gas outlet 6 at the upper portion of the upper region of the vessel 1. Reacted particles 14 are discharged through the overflow pipe 5.

The gas 10 flowing through fluidized bed 12 also flows through the detector vessel 71, through the wire nets 8 to produce a pressure drop $\Delta PdR$ across the contained detector particles 15 which form a fixed bed in the vessel 71 as shown in FIG. 3. Also, the produced gas 13 flows through the detector vessel 72 and produces another pressure drop $\Delta Pd$ across the detector particles 15 in the vessel 72 which contains also a fixed bed. The pressure drops are detected through the sensing conduits 91 and 92. As described before, the ratio between the pressure drops across the detector vessels 71 and 72 is $\Delta Pd/\Delta PdR$ and is a function of fluid velocity U and minimum fluidizing velocity Umf, and the ratio represents $U/Umf$ or $(U/Umf)^2$ by suitably selecting the detecting particles 15, as described before. Thus, normal control means, 2, easily regulates th flow rate of the gas 10 and feed quantity of the particles 11 to be treated, to maintain the desired fluidized condition.

The detector vessels 71 and 72, according to the present invention, accurately detect the ratio $\Delta Pd/\Delta PdR$, which represents the function $f(U, Umf)$ which can be $U/Umf$ or $(U/Umf)^2$, by suitably selecting the detecting particles 15. Also, as the detector vessel 71 is within a range of 1/7 of the inside diameter of the reactor vessel from the inside wall of the reactor vessel, the pressure drop at the minimum fluidizing velocity Umf can be accurately detected. It is known that in fluidized bed reactors, the region of the velocity Umf is produced near the inside wall of the reactor. This will be explained referring to FIG. 4 which shows the fluidized condition in the reactor vessel 1. In FIG. 4, thick arrows show particles flow and slender arrows show gas flow. Near the inside wall surface of the vessel 1, some particles move downwards and few bubbles 121 flow upwards. The gas velocity flowing along the inside wall surface is about the velocity Umf, despite mean fluid velocity U. The inventors of the present invention used a model of the reactor vessel 1 of 250 mm inside diameter. The detector vessel 71 was a tube 100 mm long having an inner diameter of d mm made of stainless steel. The detector vessel was mounted in the model reactor vessel at 50 mm upwards from the gas distributor 21. When diameter d was more than 65 mm, the pressure drop $\Delta Pd$ was fractuated irregularly and was affected by gas bubbles. When d was 50 mm, $\Delta Pd$ was intermittently unstable. When d was about 35 mm, pressure drop $\Delta Pd$ was constant and shows stable gas flow through the detector vessel 71. The experiment shows that when the detector vessel 71 is arranged near the center of the reactor vessel 1, gas bubbles 121 affect the pressure drop across the detector vessel, and that inside diameter of the detector vessel 71 is determined by inside diameter of the reactor vessel. The ratio of diameter of the detector vessel and the reactor vessel is preferably 1:7.14. The detector vessel 71 is to be mounted near the inside surface of the reactor vessel 1 within a range of 1/7 of the inside diameter of the reactor vessel. As the upper detector vessel 72 is in the upper stage of the reactor vessel 1 near the fluidized bed surface, gas composition and temperature in the detector vessel 72 are fairly close with those in the detector vessel 71.

The fluidized bed reactor shown in FIG. 3 was utilized as a gas producer of coal. In this case, the gas 10 was carbon dioxide gas at 950° C., the particles 11 to be treated coal, and the reacted particles 14 ash consisting mainly of carbon. Table 1 shows the specification.

TABLE 1

| Particles to be treated | | Taiheiyo Coal |
|---|---|---|
| | density | 1.4 g/cm$^3$ |
| | grain size | 12-14 mesh |
| Supply gas | | CO$_2$ gas |
| Detector particle | | Spherical alumina (Al$_2$O$_3$ > 99.9%) |
| | density | 3.96 g/cm$^3$ |
| | grain size | 1.8 mm $\phi$ |
| | height of layer | 100 mm |

In this case, the ratio $\Delta Pd/\Delta PdR$ represents $U/UmfR$. At first, range of $U/UmfR$ provides proper fluidized bed condition. Supply quantity of coal was 7.0 kg/hr., and flow rate of the $CO_2$ gas was varied. The result is shown in Table 2.

TABLE 2

| $CO_2$ gas flow rate (Nm³/hr) | 6.2 | 8.5 | 3.6 |
|---|---|---|---|
| Gas inlet temperature (°C.) | 1,060 | 1,060 | 1,060 |
| Middle stage temperature (°C.) | 910 | 930 | 905 |
| Produced gas quantity (Nm³/hr) | 13.8 | 18.7 | 7.9 |
| PdR (mm Aq) | 31 | 33 | 30 |
| Pd (mm Aq) | 93 | 135 | 50 |
| U/UmfR | 3.0 | 4.1 | 1.7 |
| Remarks | good fluidizing | too much entrainment | lack of fluidizing |

When the $CO_2$ gas flow rate was increased to 8.5 Nm³/hr., the fluid velocity U was too large, and too much entrainment of fines was realized so that it was not suitable for operation as a gas producer of coal. When $CO_2$ gas flow rate was decreased to 3.6 Nm³/hr, the fluid velocity U was too small, and sufficient fluidized bed was not produced, so that it was not a proper operation. Thus, a U/Umf value which provides a good fluidized bed condition was between 1.8–4.0. Sufficient operations were performed within this range and the results are shown in Table 3.

TABLE 3

| Solid product | ash | 51% |
|---|---|---|
| | carbon | 49% |
| | density | 0.68 g/cm³ |
| Product gas | $CO_2$ | 10.6 Vol % |
| | CO | 76.0 Vol % |
| | $H_2$ | 6.6 Vol % |
| | $CH_4$ | 5.8 Vol % |
| | $C_2H_4$ | 1.0 Vol % |

In the example shown, characteristics of particles and gas substantially change by reaction so that characteristics of coal and supply gas cannot be used to assume the velocities U and UmfR. For example, density of coal is 1.4 g/cm³, and the solid product discharged from the reactor is only 0.68 g/cm³ which is 51% less than raw coal. The gas supplied is $CO_2$ gas, and the produced gas consists mainly of CO, $CO_2$, $H_2$ and $CH_4$. Gas flow rate changes from 1.3 to 1.8 Nm³/kg of coal. Thus, operation of the reactor must correspond to the changing conditions in the reactor. Accordingly, only the detector vessels, according to the present invention, can be effectively used, to detect ever-changing operating conditions.

FIG. 5 shows a fluidized bed reactor which is a second embodiment of the present invention. In FIG. 5 the same reference numerals with the embodiment shown in FIG. 3 indicates similar parts or portions and will not be explained further. The difference between FIG. 5 and FIG. 3 is that, the produced gas outlet 6 is opened at the top of the reactor vessel 1, and that the top opening is filled with detecting particles 15 on a wire net 81 to form the detector vessel 72. As before, the sensing conduits 92 communicate with the detector vessel 72 to measure pressure drop across the layer of the detecting particles. In the embodiment shown, fluid velocity U is increased in the gas outlet 6 compared with that of gas in the body of the reactor vessel 1, however, this can be converted easily. The operation and advantages of the reactor shown in FIG. 5 are similar with those of the reactor shown in FIG. 3.

The embodiments shown in FIGS. 3 and 5 relate to single stage fluidized bed reactors. The present invention can clearly be applied to multi-stage fluidized bed reactors.

It will be appreciated that the fluidized bed reactor according to the present invention directly detects the fluid velocity U and the minimum fluidizing velocity Umf under operation as a function f (U, Umf) or in simpler form U/Umf or (U/Umf)² by suitably selecting detecting particles in the detector vessels. Thus, very accurate operation and control of the fluidized bed can be obtained in response to variations of reacting conditions in the reactor. Consequently, the fluidized bed reactor is operated steadily whether the operating conditions are changed or not.

What is claimed is:

1. A fluidized bed reactor including a reactor vessel vertically divided into upper, middle and lower regions by spaced two gas distributors, a gas inlet communicated with the lower region, a solid inlet communicated with the middle region to introduce particles to be treated, a gas outlet communicated with the upper region, and a solid overflow pipe communicated with the middle region of the reactor vessel, the improvement comprising
   a first detector vessel mounted near the inside surface of the middle region of the reactor vessel and adapted to pass gas flowing in the region,
   a second detector vessel mounted in the upper region and adapted to pass gas flowing in the region,
   detecting particles contained in the first and second detector vessels and having larger minimum fluidizing velocities than that of the particles to be treated,
   a first and second pressure drop measuring means for measuring pressure drops across said detecting particles contained in the first and second detector vessels, respectively, and
   control means controlling supply quantities of said gas and said particles to be treated based on the pressure drops measured by said pressure drop measuring means.

2. A reactor claimed in claim 1, in which said first detector vessel is mounted within a range which is 1/7 of the inside diameter from the inside surface of the reactor vessel.

3. A reactor claimed in claim 1, in which said second detector vessel is mounted near the upper gas distributor.

4. A reactor claimed in claim 1, in which said gas outlet is opened at the top end of the reactor vessel and forms the second detector vessel.

* * * * *